(12) United States Patent
Tani

(10) Patent No.: US 7,327,521 B2
(45) Date of Patent: Feb. 5, 2008

(54) COLORED LIGHT SYNTHESIS ELEMENT AND PROJECTION DEVICE THEREWITH

(75) Inventor: Naoaki Tani, Tokyo (JP)

(73) Assignee: Olympus Corporation, Tokyo (JP)

( * ) Notice: Subject to any disclaimer, the term of this patent is extended or adjusted under 35 U.S.C. 154(b) by 113 days.

(21) Appl. No.: 11/166,447

(22) Filed: Jun. 24, 2005

(65) Prior Publication Data
US 2006/0001984 A1    Jan. 5, 2006

(30) Foreign Application Priority Data
Jul. 2, 2004    (JP) .............................. 2004-196511

(51) Int. Cl.
G02B 27/14    (2006.01)
(52) U.S. Cl. ...................... 359/629; 359/632; 359/638; 353/81; 348/336; 348/337
(58) Field of Classification Search ................ 359/629, 359/634, 636, 638; 348/337, 338, 336; 353/81
See application file for complete search history.

(56) References Cited

U.S. PATENT DOCUMENTS

2004/0070736 A1*    4/2004    Roddy et al. ................. 353/31
2006/0285217 A1*    12/2006   Roth ........................... 359/634

FOREIGN PATENT DOCUMENTS

JP    11237604    8/1999
JP    2001290010  10/2001

* cited by examiner

Primary Examiner—Hung X. Dang
Assistant Examiner—Joseph Martinez
(74) Attorney, Agent, or Firm—Volpe & Koenig PC

(57) ABSTRACT

The invention includes a first incidence plane, a second incidence plane, a third incidence plane, a first synthesis plane and a second synthesis plane that are interiorly orthogonal to each other. The first synthesis plane reflects light of a first color component that enters the first incidence plane, and transmits light of a second color component that enters the second incidence plane, having the first color component and the second color component, at least a portion of which has the same color component, and light of a third color component that enters the third incidence plane. The second synthesis plane reflects the light of the third color component that enters the third incidence plane, and transmits the light of the first color component that enters the first incidence plane and the light of the second color component that enters the second incidence plane. The light that enters the first, second, and third incidence planes is synthesized through the first synthesis plane and the second synthesis plane.

7 Claims, 9 Drawing Sheets

COLORED LIGHT SYNTHESIS ELEMENT AND PROJECTION DEVICE THEREWITH

PRIORITY CLAIM

Priority is claimed on Japanese Patent Application No. 2004-196511, filed Jul. 2, 2004, the content of which is incorporated herein by reference.

BACKGROUND OF THE INVENTION

1. Field of the Invention

The invention relates to a colored light synthesis element and to a projection device using the colored light synthesis element.

2. Description of Related Art

Recently, a colored light synthesis element synthesizing red, green, and blue light and a projection device using the color synthesis element have been proposed. See, for example, Japanese Unexamined Patent Publications Nos. Hei 11-237604 (called "Patent Document 1" hereinbelow) and 2001-290010 (called "Patent Document 2" hereinbelow). A liquid crystal projection device described in Patent Document 1 and a projection type image display device described in Patent Document 2 separate white light from a lamp light source into three color components RGB by a dichroic mirror, and then perform a spatial modulation of light of the three color components by a liquid display element placed in each optical path. The light of the three color components is synthesized again by a colored light synthesis element. The synthesized light is projected by a projection lens, so that an image can be displayed.

Since white light is separated into three color components by a dichroic mirror, there is no overlapping of color components with respect to the light of the three color components. When the light of the three color components is synthesized using the difference in the color components by a colored light synthesis element having two dichroic surfaces, the light of the three color components can be efficiently synthesized.

Specifically, according to the liquid crystal projector device 100 described in Patent Document 1, as shown in FIG. 12, after white light from a high pressure mercury lamp 101 passes through an integrator (flyeye lens) 101a, the blue component is separated by a dichroic mirror 102 that transmits B component. Moreover, the green component and the red component are separated by a dichroic mirror 103 that transmits the R component. The light of each color component passes through LCD panels (a LCD 104 for R, a LCD 105 for G, and a LCD 106 for B) placed in each optical path to be synthesized again on two dichroic surfaces of a cross prism 107. The synthesized light is projected on a screen 109 through a projection lens 108. In this arrangement, the cross prism 107 is used as a colored light synthesis element, and includes two dichroic surfaces that are crossed, inside the element enclosed by three incidence surfaces and one emission surface.

According to a colored light synthesis element 110 used in the projection type image display device described in Patent Document 2, as shown in FIG. 13, the blue component and the green component are synthesized on a first dichroic surface 110a, and then the red component is synthesized on a second dichroic surface 110b. This structure is employed to avoid ghost caused by stray light produced between the opposite incidence surfaces of the cross prism, so that light from a single lamp light source is separated into light of individual color components. An object of resynthesizing the separated light is the same as that of the cross prism.

The emission spectrum for a high pressure mercury lamp generally used in a projection device that uses a conventional a colored light synthesis element is shown in FIG. 14. The line spectrum of mercury is fundamental. The spectrum around 440 nm is used as the blue component; the spectrum around 550 nm as the green component. The red component has no corresponding bright line spectrum, and uses weak continuous spectrum components. In addition, the line spectrum around 580 nm is the orange component. If the orange component is used as the red or green component, because brightness of color is lost, the orange component is not generally supposed to be used as unnecessary light component. Consequently, according to the conventional projection devices, since distance between the wavelengths of each color component is wide, separation or synthesis of color components was easily performed by dichroic mirrors or a dichroic prism.

SUMMARY OF THE INVENTION

The invention provides a colored light synthesis element for synthesizing thereinside light input from a plurality of incidence planes to emit. The colored light synthesis element comprises a first incidence plane; a second incidence plane approximately orthogonal to the first incidence plane; a third incidence plane approximately parallel to the first incidence plane and approximately orthogonal to the second incidence plane; and a first synthesis plane and a second synthesis plane located inside of the colored light synthesis element approximately orthogonal to each other, wherein the first synthesis plane reflects light of a first color component input at the first incidence plane, and transmits light of a second color component input at the second incidence plane, at least a portion of the light of the second color component having the same color component as the first color component, and light of a third color component input at the third incidence plane; and wherein the second synthesis plane reflect the light of the third color component input at the third incidence plane, and transmits the light of the first color component input at the first incidence plane and the light of the second color component input at the second incidence plane, so that each light input at the first, second, and third incidence planes is synthesized through the first synthesis plane and the second synthesis plane.

According to the colored light synthesis element of the invention, the first synthesis plane reflects at least light input with an s-polarization component with respect to the first synthesis plane of the light of the first color component input at the first incidence plane, transmits at least light input with a p-polarization component with respect to the first synthesis plane of the light of the second color component input at the second incidence plane, and transmits at least the light input with the s-polarization component with respect to the first synthesis plane of the light of the third color component input at the third incidence plane; and the second synthesis plane transmits at least light input with the s-polarization component with respect to the second synthesis plane of the light of the first color component input at the first incidence plane, transmits at least light input with p-polarization component with respect to the second synthesis plane of the light of the second color component input at the second incidence plane, and reflects at least the light input with the s-polarization component with respect to the second synthesis plane of the light of the third color component input at the third incidence plane.

According to the color synthesis element of the invention, the second color component has a central wavelength which is between the central wavelength of the first color component and that of the third color component.

According to the colored light synthesis element of the invention, the first color component and the second color component are the same color component.

According to the colored light synthesis element of the invention, the proportion of light quantity of a spectrum range common to the first color component in the second color component with respect to total light quantity of the second color component is larger than the proportion of light quantity of a spectrum range common to the third color component in the second color component.

The colored light synthesis element of the invention further comprises a fourth incidence plane; and a third synthesis plane for transmitting first synthesized light synthesized through the first synthesis plane and the second synthesis plane input at the first, second and third incidence planes, and for reflecting light of a fourth color component input at the fourth incidence plane.

According to the colored light synthesis element of the invention, the third synthesis plane is placed so that an incident angle of the first synthesized light and the fourth color component is smaller than an incident angle of light input at the first synthesis plane from the first, second and third incidence planes and an incident angle of light input at the second synthesis plane from the first, second and third incidence planes.

According to the colored light synthesis element of the invention, the fourth color component has a central wavelength which is longer or shorter than any of the central wavelengths of the first color component, the second color component and the third color component.

According to the colored light synthesis element of the invention, the proportion of light quantity of a spectrum range common to the second color component in the first color component with respect to total light quantity of the first color component is larger than the proportion of light quantity of a spectrum range common to the fourth color component in the first color component.

The invention also relates to a projection device having a colored light synthesis element described above. The projection device comprises a light source for emitting illumination light; a first spatial modulation element placed between the light source and the first incidence plane for modulating the light of the first color component of the illumination light of the light source; a second spatial modulation element placed between the light source and the second incidence plane for modulating the light of the second color component of the illumination light of the light source; a third spatial modulation element placed between the light source and the third incidence plane for modulating the light of the third color component of the illumination light of the light source; a fourth spatial modulation element placed between the light source and the fourth incidence plane for modulating the light of the fourth color component of the illumination light of the light source; and a projection lens for projecting light synthesized by the colored light synthesis element.

According to the projection device of the invention, the light source comprises a first light source for producing light of the first color component; a second light source for producing a light of the second color component; a third light source for producing light of the third color component; and a fourth light source for producing light of the fourth color component.

The projection device of the invention contains the light source that comprises a common light source for producing light of the first color component and light of the second color component; a third light source for producing light of the third color component; and a fourth light source for producing light of the fourth color component; and a light separation element for separating the light from the common light source into the light of the first color component and the light of the second color component.

According to the projection device of the invention, the first color component and the second color component are the same color component, and the light separation element is a polarization separation element.

According to the projection device of the invention, the first color component is green, the second color component is yellow-green, the third color component is red, and the fourth color component is blue.

Furthermore, according to the projection device of the invention, the first color component is yellow-green, the second color component is blue-green, the third color component is blue, and the fourth color component is red.

DETAILED DESCRIPTION OF THE INVENTION

Referring to FIGS. 1-9, a first embodiment in accordance with the invention will be described.

Figure 1:
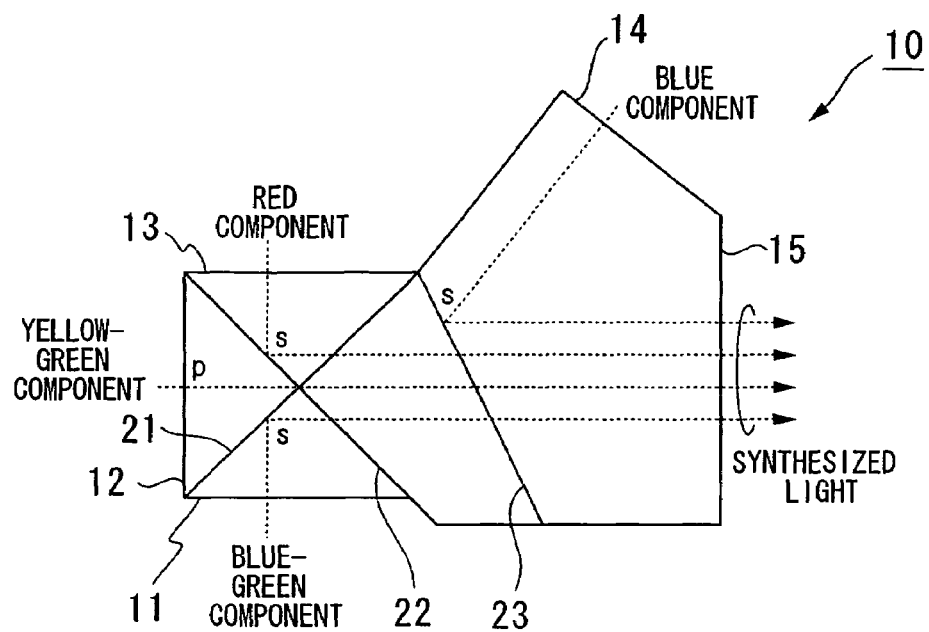
FIG. 1 is a plan view of a colored light synthesis element of a first embodiment in accordance with the invention.

A colored light synthesis element 10 of the embodiment, as shown in FIG. 1, includes a first incidence plane 11, a second incidence plane 12 orthogonal to the first incidence plane 11, a third incidence plane 13 parallel to the first incidence plane 11 and orthogonal to the second incidence plane 12, a first synthesis plane 21 and a second synthesis plane 22 that are interiorly orthogonal to each other, a fourth incidence plane 14, and a third synthesis plane 23 that passes a first synthesized light, where the synthesized light is obtained by synthesizing light which enters the first incidence plane 11, the second incidence plane 12, and the third incidence plane 13, and passes through the first synthesis plane 21 and the second synthesis plane 22, and that reflects light of a fourth color component that enters the fourth incidence plane 14.

Figure 2:
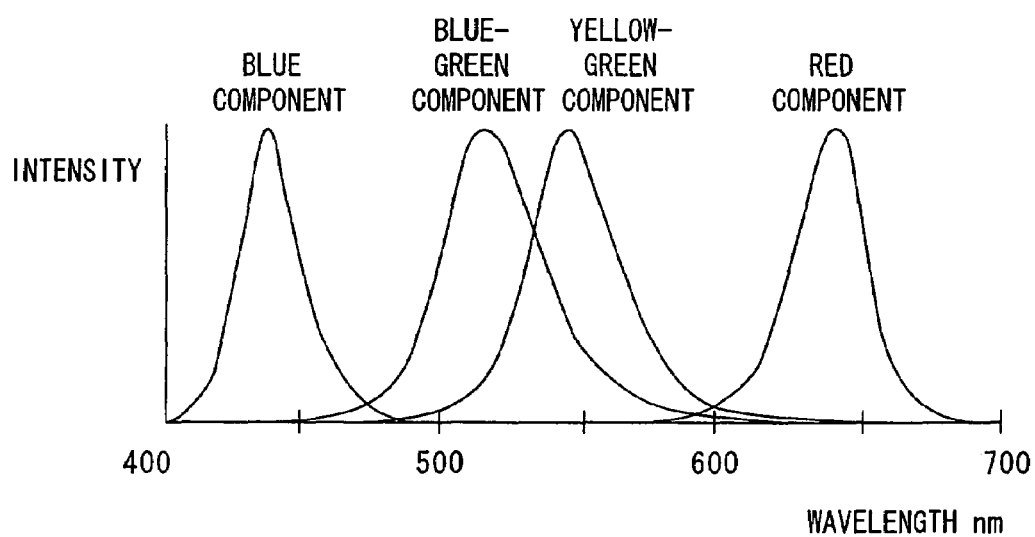
FIG. 2 is a spectral distribution of four color components that are input into the colored light synthesis element of FIG. 1, with intensity on a vertical axis and wavelength on a horizontal axis.

Using LEDs that emit different colors, light having a spectral distribution for each color component as shown in FIG. 2 is input into the color synthesis element 10. Under the situation, the spectral distribution for blue-green light that enters the first incidence plane 11 shown in FIG. 1 is overlapped with that of yellow-green light that enters the second incidence plane 12. To be specific, the proportion of light quantity of the spectral range common to the first color component in the second color component with respect to the total light quantity of the second color component is larger than that of the spectral range common to the third color component in the second color component, and is larger than that of the spectral range common to the fourth color component in the first color component. The spectrum of the LED is wider compared with the line spectrum of the lamp.

The first synthesis plane 21 reflects light of the first color component (for example, the blue-green component show in FIG. 2) that enters the first incidence plane 11, and transmits light of the second color component (for example, the yellow-green component show in FIG. 2) that enters the second incidence plane 12, having the first color component and the second color component at least a portion of which has the same color component, and light of the third color component (for example, the red component show in FIG. 2) that enters the third incidence plane 13. That is, in the embodiment, the first synthesis plane 21 reflects at least the light that enters the first synthesis plane 21 in an s-polarization component, of the light of the first color component that enters the first incidence plane 11, and transmits at least the light that enters the first synthesis plane 21 in a p-polarization component, of the light of the second color component that enters the second incidence plane 12. In addition, the first synthesis plane 21 transmits at least the light that enters the first synthesis plane 21 in the s-polarization component, of the light of the third color component that enters the third incidence plane 13.

The second synthesis plane 22 reflects the light of the third color component that enters the third incidence plane 13, and transmits the light of the first color component that enters the first incidence plane 11 and the light of the second color component that enters the second incidence plane 12. The light that enters the first incidence plane 11, the second incidence plane 12, and the third incidence plane 13 is synthesized through the first synthesis plane 21 and the second synthesis plane 22. That is, in the embodiment, the second synthesis plane 22 transmits at least the light that enters the second synthesis plane 22 in the s-polarization component, of the light of the first color component that enters the first incidence plane 11, and transmits at least the light that enters the second synthesis plane 22 in the p-polarization component, of the light of the second color component that enters the second incidence plane 12. In addition, the second synthesis plane 22 reflects at least the light that enters the second synthesis plane 22 in the s-polarization component, of the light of the third color component that enters the third incidence plane 13.

The third synthesis plane 23 is placed so that incident angles of light of the fourth color component (for example, the blue component shown in FIG. 2) and the first synthesized incident light are smaller than an incident angle of light that enters the first synthesis plane 21 from the first incidence plane 11, the second incidence plane 12, and the third incidence plane 13, and an incident angle of light that enters the second synthesis plane 22 from the first incidence plane 11, the second incidence plane 12, and the third incidence plane 13. In this situation, the first synthesis plane 21 and the second synthesis plane 22 are inclined at an angle of approximately 45 degrees with respect to the first incidence plane 11, the second incidence plane 12, and the third incidence plane 13. Furthermore, the first synthesis plane 21 and the second synthesis plane 22 are enclosed by the first incidence plane 11, the second incidence plane 12, and the third incidence plane 13, and is formed so that the first synthesis plane 21 and the second synthesis plane 22 are orthogonal to each other. Because of this, the light that orthogonally enters the first incidence plane 11, the second incidence plane 12, and the third incidence plane 13 is input into the first synthesis plane 21 and the second synthesis plane 22 at an incident angle of approximately 45 degrees. On the other hand, the third synthesis plane 23 is placed so that incident angles of the first synthesized light and the light of the fourth color component are less than 45 degrees, and, for example, in the embodiment, 26 degrees.

Optical distances, where the light of each color component travels, from the first incidence plane 11, the second incidence plane 12, the third incidence plane 13, and the fourth incidence plane 14 to an emission plane 15 are set to be almost equal.

The function of the color synthesis element 10 of the embodiment having the structure described above will be explained below.

Of the light of a blue-green component that enters the first incidence plane 11, at least the light of the s-polarized component with respect to the first synthesis plane 21, the second synthesis plane 22, and the third synthesis plane 23 is reflected at the first synthesis plane 21, at the same time, is transmitted through the second synthesis plane 22, and is transmitted through the third synthesis plane 23 to be emitted out of the emission plane 15. Of the light of yellow-green component that enters the second incidence plane 12, at least the light of the p-polarized component with respect to the first synthesis plane 21, the second synthesis plane 22, and the third synthesis plane 23 is transmitted through the first synthesis plane 21 and the second synthesis plane 22, and is transmitted through the third synthesis plane 23 to be emitted out of the emission plane 15. Of the light of the red component that enters the third incidence plane 13, at least the light of the s-polarized component, with respect to the first synthesis plane 21, the second synthesis plane 22, and the third synthesis plane 23, is transmitted through the first synthesis plane 21, at the same time is reflected at the second synthesis plane 22, and is transmitted through the third synthesis plane 23 to be emitted out of the emission plane 15. Of the light of the blue component that enters the fourth incidence plane 14, at least the light of the s-polarized component with respect to the third synthesis plane 23 is reflected at the third synthesis plane 23 to be emitted out of the emission plane 15. In this way, the light of each color component that enters the first incidence plane 11, the second incidence plane 12, the third incidence plane 13, and the fourth incidence plane 14 is synthesized through the first synthesis plane 21, the second synthesis plane 22, and the third synthesis plane 23 to be emitted out of the emission plane 15 as synthesized light.

Figure 4:
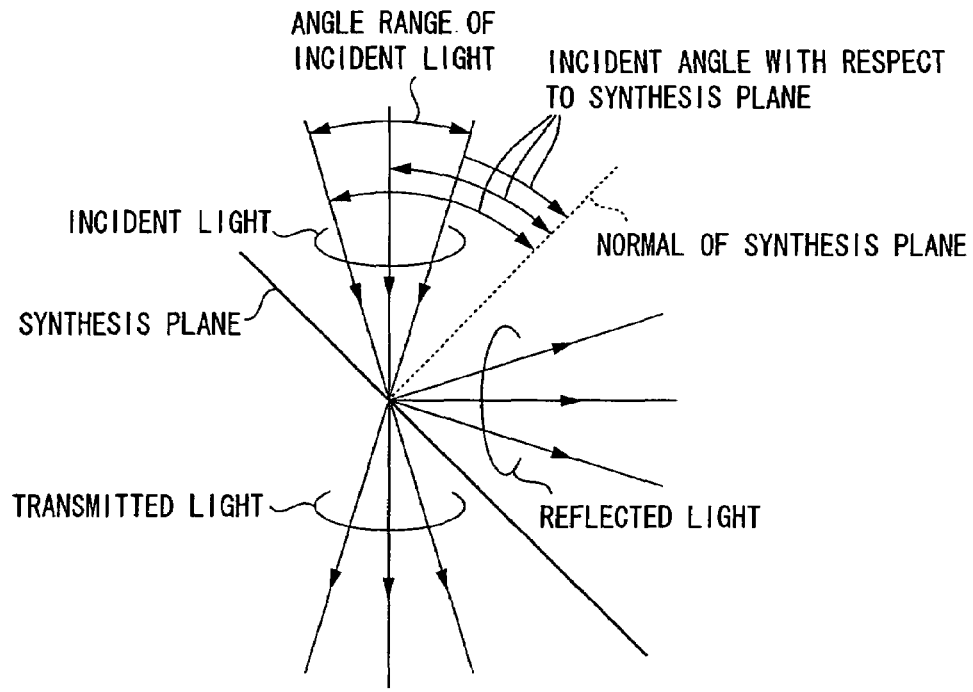
FIG. 4 is a drawing for illustrating an angle range of incident light with respect to each synthesis plane.

Generally, the light that enters each incidence plane, as shown in FIG. 4, expands conically. Consequently, there is the difference in an incident angle with respect to each synthesis plane between an outer and an inner side of the conical light.

Figure 3A:
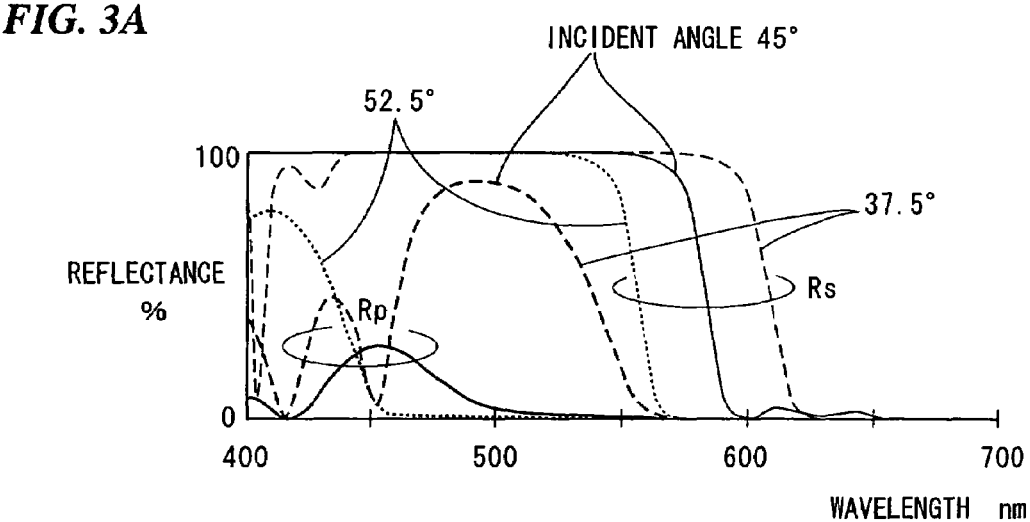
FIGS. 3A to 3C are drawings for illustrating spectral characteristics on a first synthesis plane of FIG. 1, having a reflection ratio on a vertical axis and a wavelength on a horizontal axis.
Figure 3B:
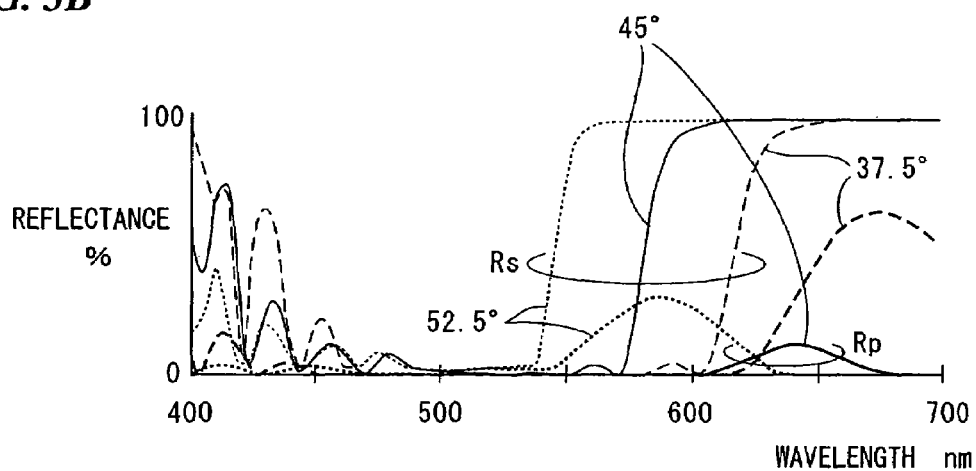
Figure 3C:
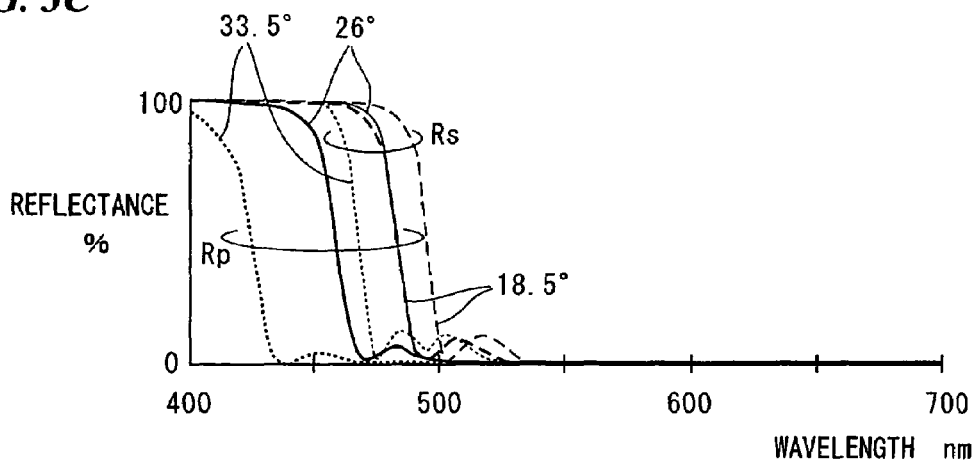

The spectral characteristics by an optical film such as a dielectric multilayer film that is formed in the first synthesis plane 21 and the second synthesis plane 22, and the third synthesis plane 23 are shown in FIGS. 3A and 3B, considering a conical expansion (for example, ±7.5 degrees) produced at the time when each color component light enters each synthesis plane, where the central angle of an incident angle is 45 degrees and 45±7.5 degrees with respect to the first synthesis plane 21 and the second synthesis plane 22. The spectral characteristics are shown in FIG. 3C, where the central angle of an incident angle is 26 degrees and 26±7.5 degrees with respect to the third synthesis plane 23. In the figures, Rs represents the spectral reflection characteristics of an s-polarization component at each incident angle; Rp the spectral reflection characteristics of a p-polarization component at each incident angle.

As can be understood from the characteristics, the first synthesis plane 21 has a characteristic that reflects the s-polarization component near 480-600 nm, and gives polarization characteristics that transmit the p-polarization component and characteristics that transmit the wavelength component over 600 nm. Because a central incident angle is 45 degrees, a large value, the polarization characteristics are apt to be easily given with respect to the same wavelength, which brings about the characteristics that effectively reflect s-polarization of the blue-green component and effectively transmit p-polarization of the yellow-green component. The design of an appropriate number of dielectric multilayer films easily makes a wavelength characteristic of the s-polarization component steep. Transmitting the s-polarization of the red component effectively, the characteristics are obtained that effectively reflect the s-polarization of the blue-green component.

The second synthesis plane 22 has a characteristic that transmits the wavelength component near 480-600 nm, and reflects the s-polarization component over 580 nm. Because a central incident angle is 45 degrees, a large value, the polarization characteristics are apt to be easily given, which brings about the characteristics that effectively reflect s-polarization of the red component and effectively transmit p-polarization of the yellow-green component close in wavelength. The design of an appropriate number of dielectric multilayer films easily makes a wavelength characteristic of the s-polarization component steep. Reflecting s-polarization of the red component effectively, the characteristics are obtained that effectively transmit s-polarization of the blue-green component.

Furthermore, the third synthesis plane 23 has a characteristic that transmits the wavelength component over 480 nm, not depending on the polarization component, and reflects the s-polarization component below 480 nm. Because a central incident angle is 26 degrees, a small value, dependence on polarization can be made smaller and transmitting band not dependent on polarization can be made larger, which, as a result, produces the characteristics that effectively transmit light having both polarization components synthesized by the first synthesis plane 21 and the second synthesis plane 22 and a wide band of wavelength, and effectively reflect s-polarization of the blue component.

According to the colored light synthesis element 10 of the embodiment, when the light having a common color component from the first incidence plane 11 and the second incidence plane 12 is synthesized, the light of another color component from the third incidence plane 13 can be synthesized, and furthermore the light of the fourth color component that enters the fourth incidence plane 14 can be synthesized. Therefore, synthesized light having more color components can be obtained. Making use of a difference in the polarization components, the light having a common color component from the first incidence plane 11 and the second incidence plane 12 can be effectively synthesized on the first synthesis plane 21. At the same time, making use of a difference in the color components, the light of another color component from the third incidence plane 13 can be effectively synthesized with the light from the first synthesis plane 21 and the second synthesis plane 22.

Figure 5:
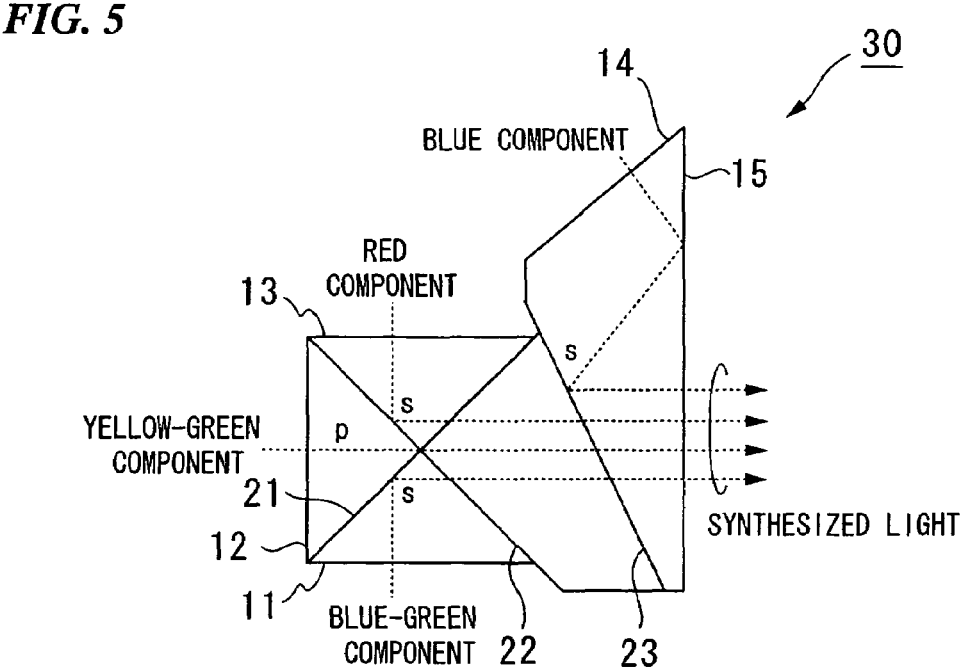
FIG. 5 is a plan view for illustrating a first variant of the colored light synthesis element of FIG. 1.

A color synthesis element 30 of the embodiment, as shown in FIG. 5, can be used. Light of the blue component that enters the fourth incidence plane 14 is once totally reflected on the inner surface of the emission plane 15 to enter the third incidence plane 13. According to this structure, a prism having the fourth incidence plane 14, the emission plane 15, and the third synthesis plane 23 can be made smaller. In addition, since optical distance from each incidence plane that light of each color component passes to the emission plane can be made shorter, the colored light synthesis element itself can be further made smaller, considering an expansion of light based on the angular distribution of a conical shape by an incident light.

Figure 6:
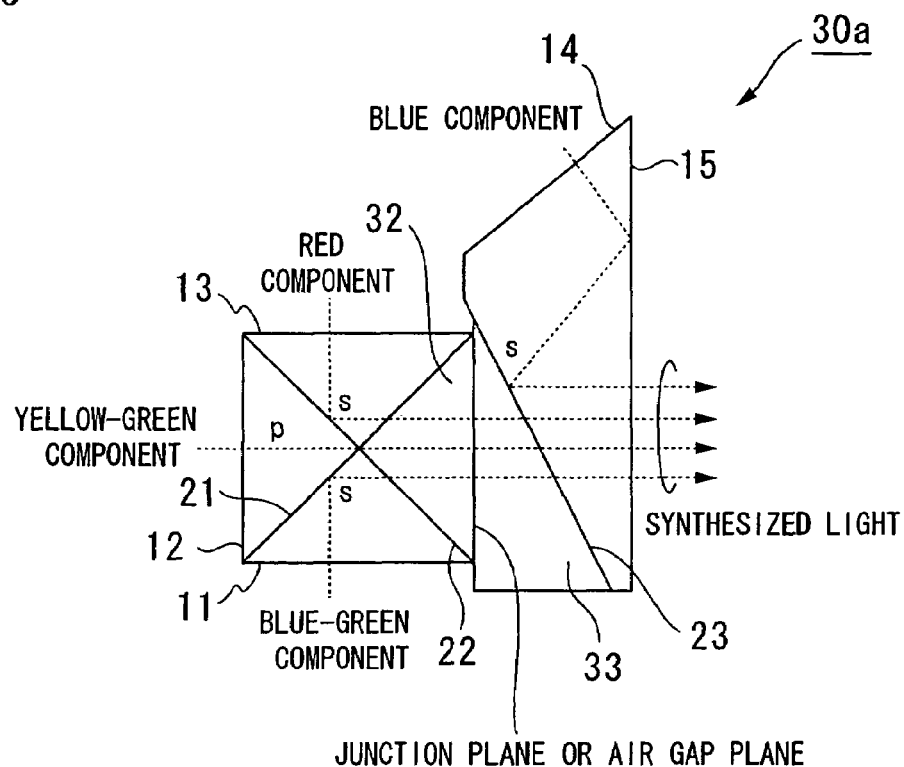
FIG. 6 is a plan view for illustrating a second variant of the colored light synthesis element of FIG. 1.

As shown in FIG. 6, the prism enclosed by the first synthesis plane 21, the second synthesis plane 22, and the third synthesis plane 23 is divided into two prisms (a first prism 32 and a second prism 33) by a plane parallel to the second incidence plane 12. The divided first prism 32 and second prism 33 may be glued, or may have a minute air gap therebetween to constitute a color synthesis element 30a. According to this structure, the division of the prism makes a combination of prisms having a simpler shape, which improves manufacturing quality.

Figure 7:
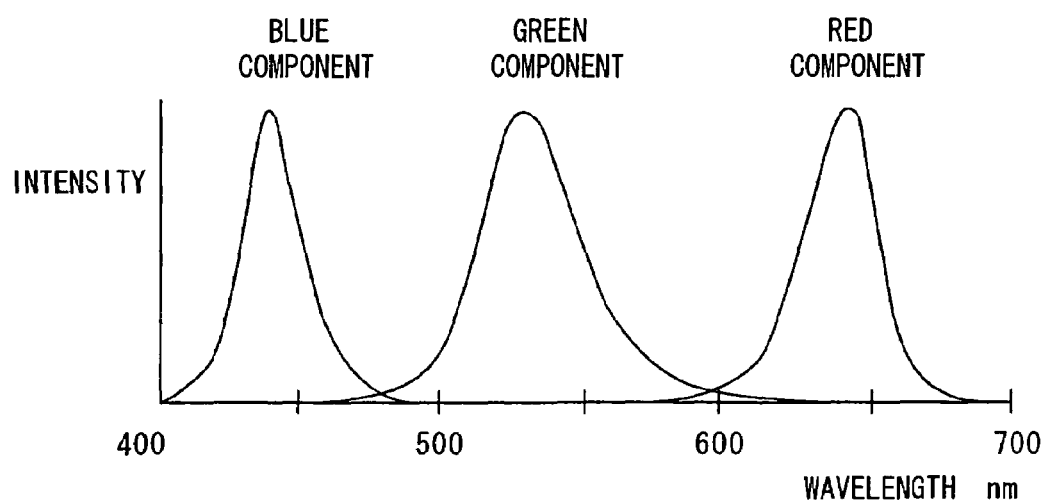
FIG. 7 is a spectral distribution of three color components that are input into the third variant of the colored light synthesis element of FIG. 1, with intensity on a vertical axis and wavelength on a horizontal axis.
Figure 8:
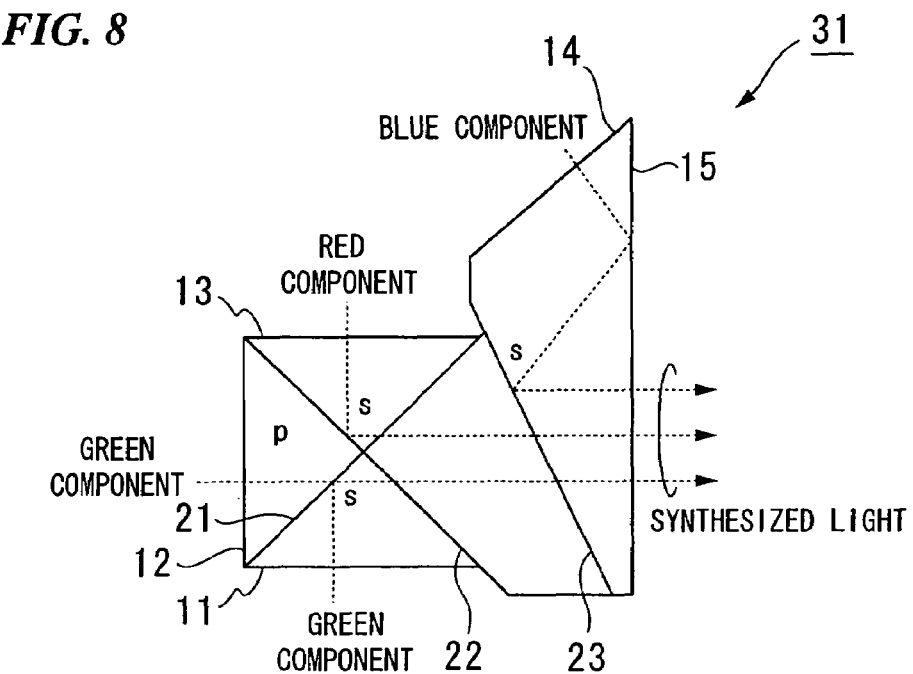
FIG. 8 is a plan view for illustrating a third variant of the colored light synthesis element of FIG. 1.

The first color component and the second color component that enter the color synthesis element 30 shown in FIG. 5, as shown in FIG. 7, may be the same color component (for example, green component). In this situation, as shown in FIG. 8, s-polarization component of the green component is input into the first incidence plane 11, and p-polarization component of the green component is input into the second incidence plane. That is, the polarization components are different at the first incidence plane 11 and the second incidence plane 12, but the light whose color component is the identical green component is input. The red component is input into the third incidence plane 13, and the blue component is input into the fourth incidence plane 14 so as to synthesize light. Consequently, because the same color component can be synthesized, the synthesized light having a lot of specified color component can be obtained.

Figure 9:
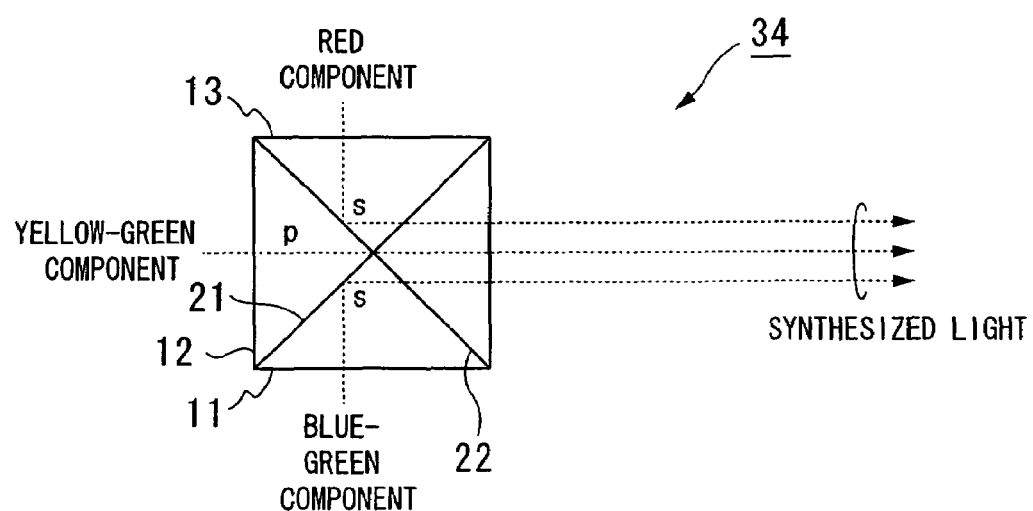
FIG. 9 is a plan view for illustrating a fourth variant example of the colored light synthesis element of FIG. 1.

When the three components (red, yellow-green, and blue-green components) are sufficient, a color synthesis element 34, as shown in FIG. 9, may be appropriate that includes the first incidence plane 11, the second incidence plane 12, the third incidence plane 13, the first synthesis plane 21, and the second synthesis plane 22.

Figure 10:
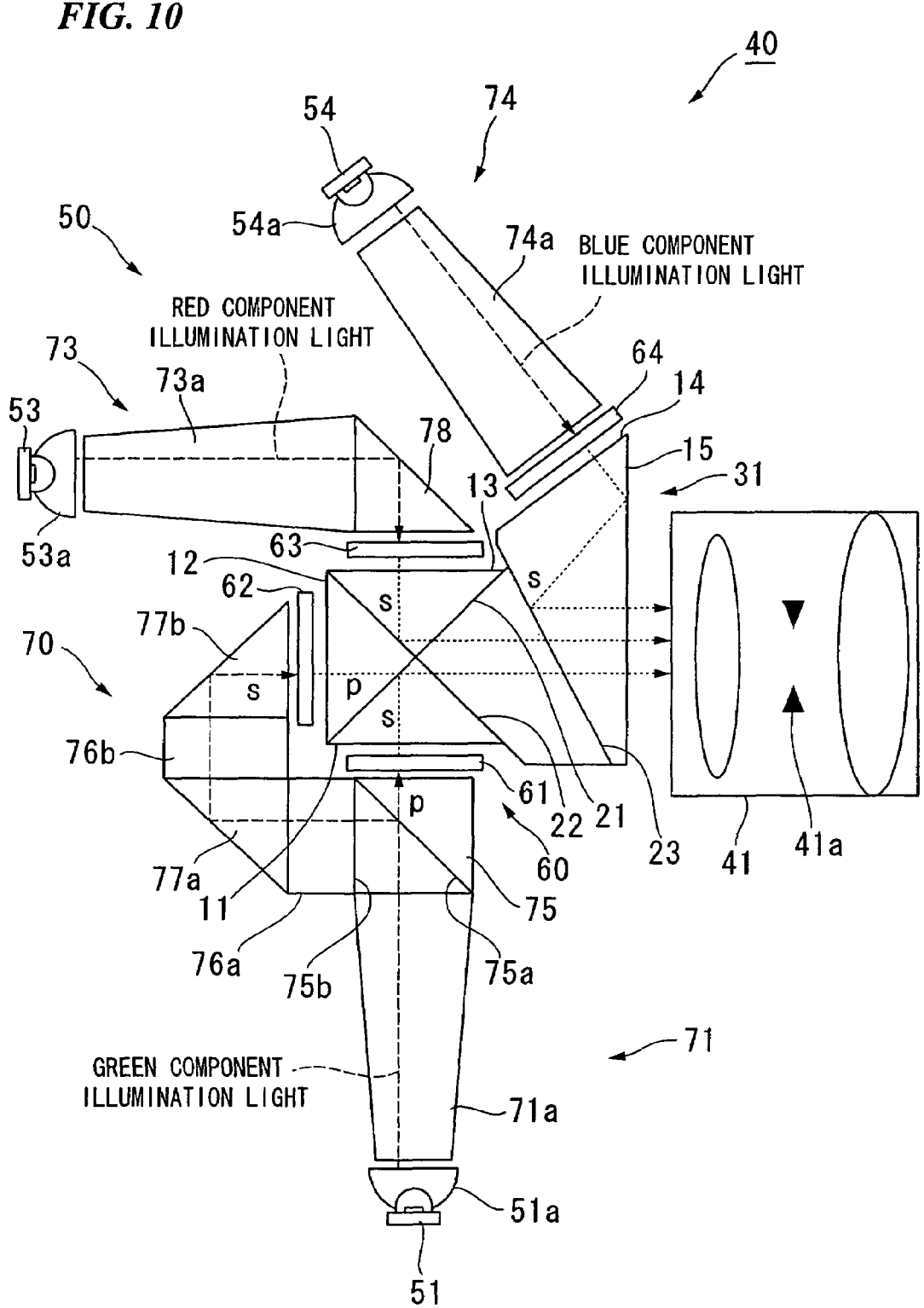
FIG. 10 is a plan view of a projection device of a second embodiment in accordance with the invention.
Figure 11:
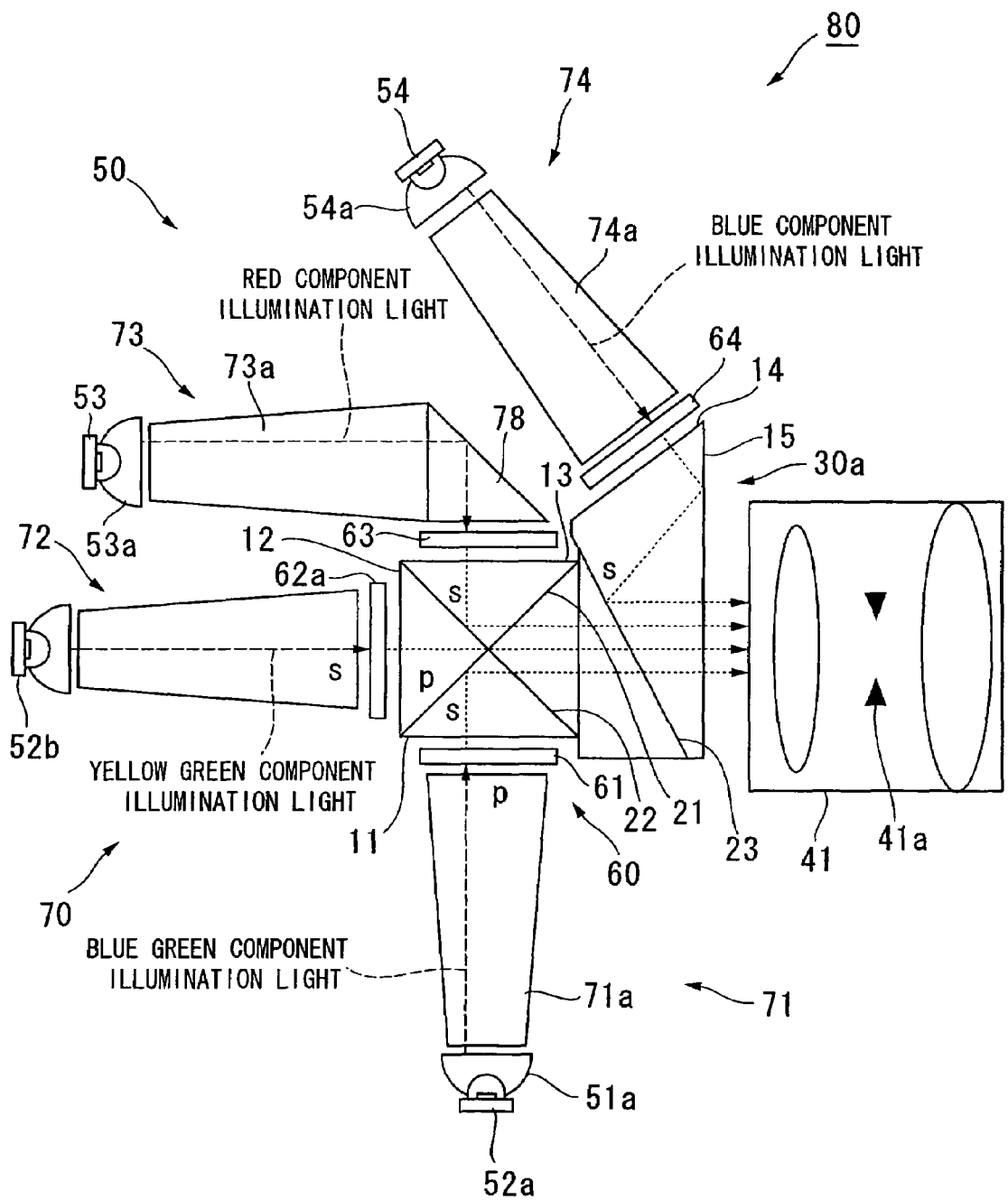
FIG. 11 is a plan view for illustrating a first variant of the projection device of FIG. 10.
Figure 12:
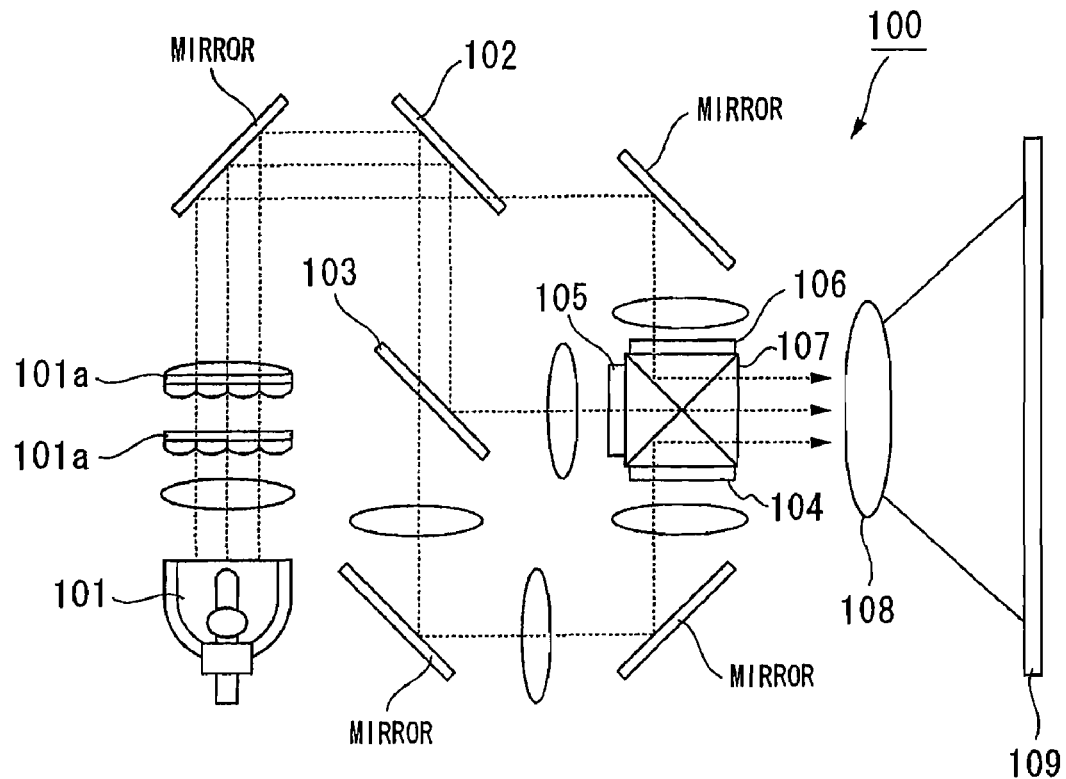
FIG. 12 is a plan view for illustrating a projection device using a conventional colored light synthesis element.
Figure 13:
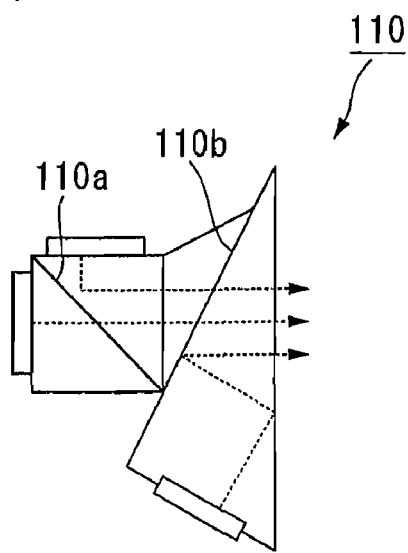
FIG. 13 is a plan view for illustrating a conventional colored light synthesis element.
Figure 14:
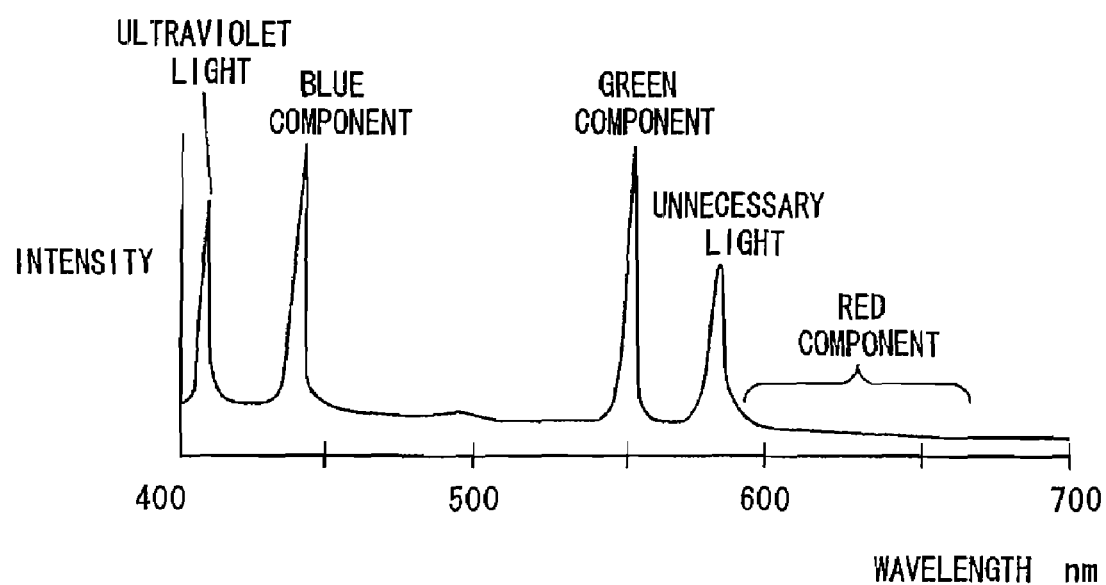
FIG. 14 is a spectral distribution of a lamp that is used in a conventional projection device, with intensity on a vertical axis and wavelength on a horizontal axis.

Referring to FIGS. 10 and 11, a second embodiment in accordance with the invention will be described below. The reference numerals and names of the parts of the colored light synthesis element 10 in the first embodiment are assigned to the identical parts in each embodiment to be described below, and an explanation of the identical elements are not given.

A projection device 40, as shown in FIG. 10, includes a colored light synthesis element 31 shown in FIG. 8.

The projection device 40 includes a light source 50 for emitting illumination light of each color component, a transmissive liquid crystal panel (a spatial modulation element) 60 for modulating light of each color component, a light guiding portion 70 for guiding the illumination light emitted by the light source 50 to the colored light synthesis element 31, and a projection lens 41 having a brightness aperture 41a for adjusting brightness for projecting light synthesized by the colored light synthesis element 31.

The light source 50 includes a green LED (a common light source) 51 for illuminating (generating) a first color component and a second color component to a first incidence plane 11 and a second incidence plane 12, a red LED (a third light source) 53 for illuminating a third color component to a third incidence plane 13, and a blue LED (a fourth light source) 54 for illuminating a fourth color component to a fourth incidence plane 14. The first color component and the second color component have the same color component, for example, a green component. The third color component is a red component, while the fourth color component is a blue component. The light source 50 includes take-in elements 51a, 53a, and 54a having a parabolic reflective plane or lens plane for effectively taking in the light of each color component from each LED 51, 53, and 54 into the light guiding portion 70, respectively.

The spatial modulation element includes a green LCD (liquid crystal display; a first spatial modulation element) 61 placed between the green LED 51 and the first incidence plane 11 for modulating the light of the first color component of the emitted light from the green LED 51; a green LCD (a second spatial modulation element) 62 placed between the green LED 51 and the second incidence plane 12 for modulating the light of the second color component of the emitted light from the green LED 51; a red LCD (a third spatial modulation element) 63 placed between the red LED 53 and the third incidence plane 13 for modulating the light of the third color component of the emitted light from the red LED 53; and a blue LCD (a fourth spatial modulation element) 64 placed between the blue LED 54 and the fourth incidence plane 14 for modulating the light of the fourth color component of the emitted light from the red LED 54.

The light guiding portion 70 contains a common light guiding portion 71 for guiding the light emitted by the green LED 51, a third light guiding portion 73 for guiding the light emitted by the red LED 53, and a fourth light guiding portion 74 for guiding the light emitted by the blue LED 54.

The common light guiding portion 71 contains a polarization separation element (a light separation element) 75 emitted by the green LED 51, having a polarization separation plane 75a that separates the light guiding a common tapered rod 71a into the light of the first color component and the light of the second color component; light guiding rods 76a and 76b for guiding the light reflected by the polarization separation element 75; and reflection prisms 77a and 77b for deflecting the light from the light guiding rods 76a and 76b by approximately 90 degrees.

All the planes of the light guiding rods 76a and 76b, and all the planes of the reflection prisms 77a and 77b are parallel to or vertical to a polarization direction of the light of the s-polarized component reflected by the polarization separation plane 75a. Because of this structure, while the polarization direction of the light of the s-polarized component reflected by the polarization separation plane 75a of the polarization separation element 75 is preserved through the light guiding rods 76a and 76b and the reflection prisms 77a and 77b, the light of the s-polarized component can be deflected by approximately 180 degrees.

The indices of refraction of the polarization separation element 75 and the reflection prisms 77a and 77b are higher than those of the common tapered light guiding rod 71a and the light guiding rods 76a and 76b. Making use of total reflection at an interface between the reflection prisms 77a and 77b and the light guiding rods 76a and 76b, the light of the green component emitted by the green LED 51 is supposed to be effectively guided so that the entire light can be securely input on a 45 degree reflection plane of the polarization separation plane 75a and the reflection prisms 77a and 77b.

The third light guiding portion 73 contains a reflection prism 78 for deflecting the light by approximately 90 degrees that guides a third tapered light guiding rod 73a, emitted by the red LED 53. The reflection prism 78 is placed in order to avoid interference with a fourth tapered light guiding rod 74a for the green component. Because an index of refraction is higher than that of the third tapered light guiding rod 73a, the third tapered light guiding rod 73a guides the light. As a result, the light traveling toward the reflection prism 78 effectively propagates toward the red LCD 63.

The fourth light guiding portion 74 includes the fourth tapered light guiding rod 74a for guiding to the blue LCD 64 the light emitted by the blue LED 54

Each tapered light guiding rod 71a, 73a, and 74a, made of glass material, has an inner diameter that gradually becomes larger toward the colored light synthesis element 31 from each LED 51, 53, and 54. On account of this shape, each tapered light guiding rod 71a, 73a, and 74a restricts a light incident angle with respect to each LCD 61, 62 and 63 to a predetermined range to convert into the light having a predetermined NA. Each LCD 61, 62, 63 and 64 has a polarization plate placed so that polarization directions are orthogonal at the front and the rear. Because the light can be transmitted through each LCD 61, 62, 63 and 64, polarization direction before and after each LCD 61, 62, 63 and 64 is converted from p-polarization to s-polarization or vice versa.

The function of the projection device 40 of the embodiment having the structure described above is explained below.

Light is emitted from each LED 51, 53, and 54. The emitted light is efficiently input into each tapered light guiding rod 71a, 73a, and 74a through each take-in element 51a, 53a, and 54a, respectively. The light that is guided by each of the tapered light guiding rod 71a, 73a, and 74a is converted into light having a predetermined NA through each of the tapered light guiding rod 71a, 73a, and 74a, and is simultaneously expanded to an area that can fully emit each of the LCD 61, 62, 63 and 64. Light of the blue component directly hits the blue LCD 64, while light of the red component hits the blue LCD 63 after being reflected by the reflection prism 78. Light of the green component is separated into light of a p-polarization component and light of an s-polarization component by the polarization separation element 75. The light of the p-polarization component passes through the polarization separation plane 75a to directly enter the green LCD 61 opposite to the first incidence plane 11 of the colored light synthesis element 31. On the other hand, the light of the s-polarization component enter the green LCD 62 opposite to the second incidence plane 12 through the light guiding rods 76a and 76b and the reflection prism 77a and 77b while keeping the polarization direction. The light emitted from each of the LCD 61, 62, 63 and 64 enters colored light synthesis element 31 to be resynthesized, and is emitted from the emission plane 15 to enter the projection lens 41. Then, the light is projected on a screen (not shown) as a color image.

Each of the LCDs 61, 62, 63 and 64 of the projection device 40 in accordance with the embodiment includes a polarization plate in front and in rear. Since transmittance is controlled by rotating a polarization plane of the incident light in response to image data input, only one directional polarization component of the light incident on each of the LCDs 61, 62, 63 and 64 can be utilized. Accordingly, because light of the LEDs 51, 53, and 54 is not polarized, the red component or blue component can use only half of the light of the red LED 53 and the blue LED 54. In contrast, since the green component only inputs the necessary polarization component with respect to each of the two green LCDs 61 and 62, illumination light from the green LED 51 can be effectively utilized.

Because the light of the green component, which is once separated by the color synthesis element 31, can be effectively resynthesized, loss of the green component that most needs light quantity as a brightness component can be reduced.

The embodiments of the invention use a light source for each color component. However, instead of this, a halogen lamp or xenon lamp having a broad spectrum or a high pressure mercury lamp can be used.

Each of the tapered light guiding rods 71a, 73a, and 74a is composed of a glass material, but is not limited to this. For example, the inside of each of the tapered light guiding rods 71a, 73a, and 74a can be made hollow, and the inside may be provided with reflection coating.

Moreover, in place of the colored light synthesis element 31, the colored light synthesis element 10 or 30a may be used. When three colors of the red component, yellow-green component, and blue-green component is sufficient, the colored light synthesis element 34 may be used.

It is assumed that the green LED 51 produces light of a green component. However, instead of this, as shown in FIG. 11, a projection device 80 may include a blue-green LED (a first light source) 52a for producing the light of blue-green component 52a and a yellow-green LED (a second light source) for generating the light of yellow-green component 52b. In this situation, a polarization separation device 75, light guiding rods 76a and 76b, and reflection prisms 77a and 77b are not necessary. A second tapered light guiding rod 72 for guiding the yellow-green LED 52b into a yellow green LED (a second spatial modulation element) 62a. In this structure, because the blue-green component and the yellow-green component are emitted by an separate LED, an image having four color components can be separately generated and synthesized for projection, which realizes a projection device having a wide range of color expression.

The technical scope of the invention is not limited to the above-described embodiments. Various modifications can be made in a range without deviating from the gist of the invention.

For example, the first synthesis plane 21 reflects the light input with the s-polarization with respect to the first synthesis plane 21, of the light of the first color component input from the first incidence plane 11. However, in place of this, the light input with the p-polarization may be reflected. Likewise, the first synthesis plane 21 may transmit the light input with the s-polarization with respect to the first synthesis plane 21, of the light of the second color component input from the second incidence plane 12, or may transmit the light input with the p-polarization with respect to the first synthesis plane 21, of the light of the third color component input from the third incidence plane 13. Furthermore, the first synthesis plane 22 may transmit the light input with the p-polarization with respect to the second synthesis plane 22, of the light of the first color component input from the first incidence plane 11, may transmit the light input with the s-polarization with respect to the second synthesis plane 22, of the light of the second color component input from the second incidence plane 12, or may reflect the light input with the p-polarization with respect to at least the second synthesis plane 22, of the light of the third color component input from the third incidence plane 13.

Although the second color component is a yellow-green component, a center wavelength of the second color component should be between a center wavelength of the first color component and a center wavelength of the third color component.

Blue having a shorter center wavelength as a fourth color component is used that is shorter than any one of the center frequency for the first color component, second color component, and third color component. However, any color having a longer center wavelength can bring about the same effect.

The embodiments of the invention provide the following advantages.

According to a colored light synthesis element and a projection device using the colored light synthesis element, the advantage is produced that light having the same color component input from individual incidence planes can be efficiently synthesized.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A colored light synthesis element for synthesizing interiorly light input from a plurality of incidence planes so as to emit the synthesized light, the colored light synthesis element comprising:
    a first incidence plane;
    a second incidence plane approximately orthogonal to the first incidence plane;
    a third incidence plane approximately parallel to the first incidence plane and approximately orthogonal to the second incidence plane;
    a first synthesis plane and a second synthesis plane located inside the color synthesis element approximately orthogonal to each other;

a fourth incidence plane; and a third synthesis plane for transmitting first synthesized light synthesized through the first synthesis plane and the second synthesis plane input at the first, second and third incidence planes, and for reflecting light of a fourth color component input at the fourth incidence plane;

wherein the first synthesis plane reflects light of a first color component input at the first incidence plane, and transmits light of a second color component input at the second incidence plane, at least a portion of the light of the second color component having the same color component as the first color component, and light of a third color component input at the third incidence plane;

wherein the second synthesis plane reflects the light of the third color component input at the third incidence plane, and transmits the light of the first color component input at the first incidence plane and the light of the second color component input at the second incidence plane, so that each light input at the first, second, and third incidence planes is synthesized through the first synthesis plane and the second synthesis plane; and wherein the third synthesis plane is placed so that an incident angle of the first synthesized light and the fourth color component is smaller than an incident angle of light input at the first synthesis plane from the first, second and third incidence planes and an incident angle of light input at the second synthesis plane from the first, second and third incidence planes.

2. A projection device comprising:

a colored light synthesis element for synthesizing interiorly light input from a plurality of incidence planes so as to emit the synthesized light, the colored light synthesis element comprising:

a first incidence plane;

a second incidence plane approximately orthogonal to the first incidence plane;

a third incidence plane approximately parallel to the first incidence plane and approximately orthogonal to the second incidence plane;

a first synthesis plane and a second synthesis plane located inside the color synthesis element approximately orthogonal to each other;

a fourth incidence plane; and a third synthesis plane for transmitting first synthesized light synthesized through the first synthesis plane and the second synthesis plane input at the first, second and third incidence planes, and for reflecting light of a fourth color component input at the fourth incidence plane;

wherein the first synthesis plane reflects light of a first color component input at the first incidence plane, and transmits light of a second color component input at the second incidence plane, at least a portion of the light of the second color component having the same color component as the first color component, and light of a third color component input at the third incidence plane;

wherein the second synthesis plane reflects the light of the third color component input at the third incidence plane, and transmits the light of the first color component input at the first incidence plane and the light of the second color component input at the second incidence plane, so that each light input at the first, second, and third incidence planes is synthesized through the first synthesis plane and the second synthesis plane; and wherein the third synthesis plane is placed so that an incident angle of the first synthesized light and the fourth color component is smaller than an incident angle of light input at the first synthesis plane from the first, second and third incidence planes and an incident angle of light input at the second synthesis plane from the first, second and third incidence planes;

a light source for emitting illumination light;

a first spatial modulation element placed between the light source and the first incidence plane for modulating the light of the first color component of the illumination light of the light source;

a second spatial modulation element placed between the light source and the second incidence plane for modulating the light of the second color component of the illumination light of the light source;

a third spatial modulation element placed between the light source and the third incidence plane for modulating the light of the third color component of the illumination light of the light source;

a fourth spatial modulation element placed between the light source and the fourth incidence plane for modulating the light of the fourth color component of the illumination light of the light source; and a projection lens for projecting light synthesized by the color synthesis element.

3. A projection device as recited in claim 2, wherein the light source comprises:

a first light source for producing light of the first color component;

a second light source for producing light of the second color component;

a third light source for producing light of the third color component; and a fourth light source for producing light of the fourth color component.

4. A projection device as recited in claim 2, wherein the light source comprises:

a common light source for producing light of the first color component and light of the second color component;

a third light source for producing light of the third color component; and a fourth light source for producing light of the fourth color component; and a light separation element for separating the light from the common light source into the light of the first color component and the light of the second color component.

5. A projection device as recited in claim 4, wherein the first color component and the second color component are the same color component, and wherein the light separation element is a polarization separation element.

6. A projection device as recited in claim 4, wherein the first color component is green, the second color component is yellow-green, the third color component is red, and the fourth color component is blue.

7. A projection device as recited in claim 4, wherein the first color component is yellow-green, the second color component is blue-green, the third color component is blue, and the fourth color component is red.

* * * * *